(12) United States Patent
Hall

(10) Patent No.: US 8,479,962 B2
(45) Date of Patent: Jul. 9, 2013

(54) WET UMBRELLA CARRIER

(76) Inventor: Stephen Don Hall, Trussville, AL (US)

( * ) Notice: Subject to any disclaimer, the term of this patent is extended or adjusted under 35 U.S.C. 154(b) by 150 days.

(21) Appl. No.: 13/050,906

(22) Filed: Mar. 17, 2011

(65) Prior Publication Data

US 2012/0234885 A1    Sep. 20, 2012

(51) Int. Cl.
*B60R 11/00* (2006.01)
*B60R 7/12* (2006.01)

(52) U.S. Cl.
CPC . *B60R 11/00* (2013.01); *B60R 7/12* (2013.01); *Y10S 224/915* (2013.01)
USPC ............................. 224/482; 224/915; 224/567

(58) Field of Classification Search
USPC ................. 224/482, 567, 545, 550, 552, 405, 224/282
See application file for complete search history.

(56) References Cited

U.S. PATENT DOCUMENTS

| | | | | |
|---|---|---|---|---|
| 351,669 A * | 10/1886 | Tosso | | 248/515 |
| 1,892,601 A * | 12/1932 | Beehler | | 224/543 |
| 3,286,892 A * | 11/1966 | Marshall | | 224/317 |
| 4,445,720 A | 5/1984 | Leaf et al. | | |
| 4,543,971 A | 10/1985 | Sirota | | |
| 4,562,849 A | 1/1986 | Sirota | | |
| 4,807,920 A | 2/1989 | Fujiki | | |
| 4,941,602 A * | 7/1990 | Wells | | 224/482 |
| 4,944,434 A * | 7/1990 | Hamilton | | 224/549 |
| 5,390,837 A * | 2/1995 | Ruffolo, Jr. | | 224/482 |
| 5,396,915 A * | 3/1995 | Bomar | | 135/16 |
| 5,529,368 A * | 6/1996 | Cui et al. | | 296/99.1 |
| 6,213,137 B1 | 4/2001 | Wang | | |
| 6,959,715 B2 * | 11/2005 | Siegel | | 135/16 |
| 7,967,274 B1 * | 6/2011 | Stallings et al. | | 248/534 |
| 2002/0096616 A1 * | 7/2002 | Ratcliff et al. | | 248/539 |
| 2011/0260029 A1 * | 10/2011 | Kost | | 248/514 |

FOREIGN PATENT DOCUMENTS

| | | | | |
|---|---|---|---|---|
| DE | 29703661 U1 | * | 4/1997 | |
| JP | 57090235 A | * | 6/1982 | |
| JP | 09058364 A | * | 3/1997 | |
| JP | 09156426 A | * | 6/1997 | |
| JP | 10257957 A | * | 9/1998 | |
| JP | 2001122037 A | * | 5/2001 | |

* cited by examiner

*Primary Examiner* — Nathan J Newhouse
*Assistant Examiner* — Phillip Schmidt

(57) ABSTRACT

An umbrella carrier secures a wet umbrella outside of a vehicle. A closed umbrella is strapped or otherwise secured to at least one umbrella carrier arm that is attached to a mounting pole coupled with a vehicle window support clip or some other temporary mounting means.

4 Claims, 3 Drawing Sheets

WET UMBRELLA CARRIER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates generally to an umbrella carrier which makes possible the transporting of a wet umbrella outside of a vehicle and more particularly to at least one umbrella carrier arm that secures an umbrella and that attaches to a mounting pole coupled with at least one vehicle window support clip portion having a flat support surface adapted to engage the exterior surface of a vehicle window and a clip adapted to engage the interior surface of a vehicle window.

There are a vast number of patents related to holding umbrellas and even wet umbrellas inside of a vehicle. Several of these patents disclose specially designed compartments in various places within a vehicle. For example, Leaf, in U.S. Pat. No. 4,445,720, issued on May 1, 1984, describes an elongated tube with one closed end and one open end provided in an automobile dashboard for holding a collapsible umbrella and for passing water on the umbrella safely to a drain. Fujiki, in U.S. Pat. No. 4,807,920, issued on Feb. 28, 1989, describes a cylindrical casing disposed between the inner and outer panels of a rear fender of a vehicle. In this patent, the wet umbrella does not have to be brought into the vehicle because the specially designed compartment is between the inner wall of the vehicle and the outer wall of the vehicle. These specially designed compartments help solve the problem of what to do with a wet umbrella, but only for people who purchase vehicles so equipped.

While most related patents provide for holding a wet umbrella inside a vehicle compartment, there are a few that provide for storing an umbrella in some type of container or protecting element attachable to the exterior of a vehicle. For example, Sirota, in U.S. Pat. No. 4,562,849, issued on Jan. 7, 1986, describes a motor driven umbrella unit comprising a housing mountable on a car and having an inner hollow with motors and a transmission for opening and closing a protecting element of the umbrella and another drive for turning the umbrella into the housing and out of the housing. In this invention the motor driven umbrella is stored inside of a housing with a protecting element. Cui, in U.S. Pat. No. 5,529,368, issued on Jun. 25, 1996, describes an umbrella unit attachable to a vehicle comprising an umbrella, a means for deploying and retracting said umbrella, a container portion having an exterior and at least one door, said at least one door of said container portion opening when a control strip deploys said umbrella and said at least one door closing when said control strip retracts said umbrella. While these inventions provide the convenience of storing a wet umbrella outside of a vehicle, they also include housings or containers, motor drives, transmissions, and/or other means for deploying and retracting an umbrella. These particular inventions are quite bulky, appear to be expensive, and are not quickly and easily mountable on a vehicle, when compared to the present invention.

The present invention makes possible the convenient transporting of a wet umbrella outside of a vehicle without a bulky expensive housing. Conventional umbrellas when closed and pointed into the wind provide very little wind resistance and therefore do not require expensive housings or containers for protection. In the present invention, an umbrella is simply strapped, clipped, or otherwise secured to at least one umbrella carrier arm attached to a mounting pole coupled with a vehicle window support clip or some other vehicle mounting device. In a preferred embodiment of the invention for a conventional umbrella, two umbrella carrier units are used for securing one umbrella. One umbrella carrier arm secures an umbrella handle and a second umbrella carrier arm secures the fabric canopy of the umbrella.

BRIEF SUMMARY OF THE INVENTION

The present invention provides a convenient, affordable, novel way of transporting a wet umbrella outside of a vehicle. Conventional umbrellas when closed and pointed into the wind provide very little wind resistance and therefore do not require expensive housings or containers for protection. In the present invention, a closed umbrella pointed forward is simply strapped, clipped, or otherwise secured to at least one umbrella carrier arm attached to a mounting pole coupled with a vehicle window support clip or some other vehicle mounting device. In a preferred embodiment of the invention for a conventional umbrella, two umbrella carrier units are used for one umbrella. One umbrella carrier arm secures an umbrella handle and a second umbrella carrier arm secures the closed fabric canopy of the umbrella.

BRIEF DESCRIPTION OF THE SEVERAL VIEWS OF THE DRAWING

The foregoing and other novel features and advantages of the present invention will become more apparent and more readily appreciated by those skilled in the art after consideration of the following descriptions in conjunction with their associated drawings, of which.

DETAILED DESCRIPTION OF THE INVENTION

A preferred embodiment of the present invention will now be described in detail with reference to FIG. 1. Those skilled in the art will appreciate that the description given herein with respect to each figure is for exemplary purposes only and is not intended in any way to limit the scope of the invention. All questions regarding the scope of the invention may be resolved by referring to the appended claims.

Figure 1:
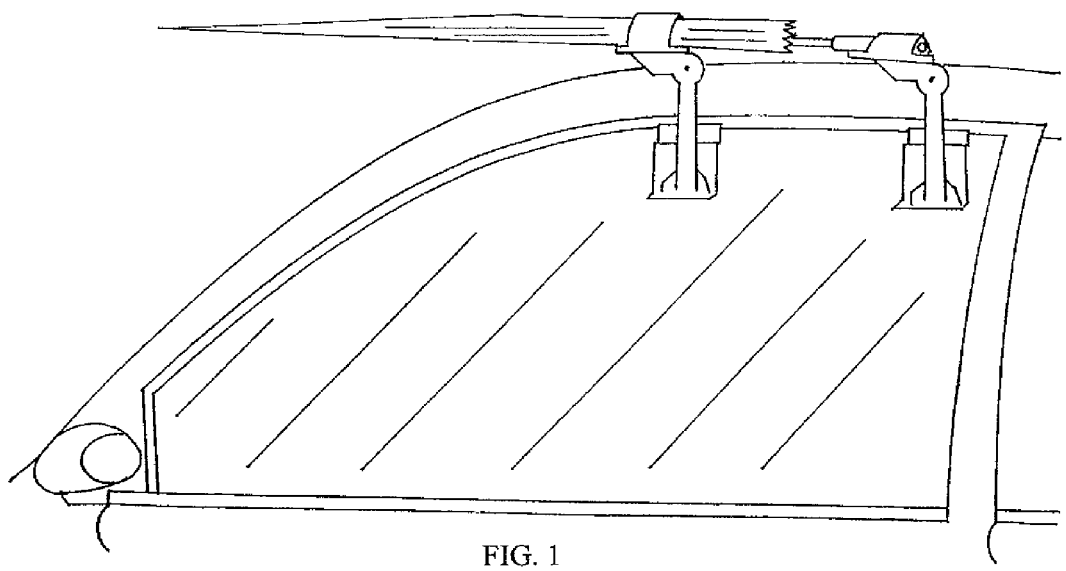
FIG. 1 is a view of a preferred embodiment of the invention for a conventional umbrella using two umbrella carrier units for one umbrella. One umbrella carrier unit secures an umbrella handle and a second umbrella carrier unit secures the closed fabric canopy of the umbrella.

FIG. 1 illustrates a current preferred embodiment of the invention for conventional umbrellas. This embodiment uses two umbrella carrier units with Velcro® straps, but those skilled in the art will appreciate that other types of straps could be used. One carrier unit is used to secure the umbrella handle and a separate carrier unit is used to secure the closed umbrella canvas canopy. When rain is predicted, a user partially lowers his vehicle window and simply clips each umbrella carrier unit to the top of the window glass using the appropriate distance apart for his particular umbrella. The carrier arms should be toward the outside of the vehicle. The user then raises his window, thereby squeezing the window support clip between the glass and the door window frame. Those skilled in the art will appreciate that other temporary mounting means for an umbrella carrier arm now known or later developed, whether alone or in various combinations, may be employed without departing from the spirit or scope of the invention. Obvious temporary mounting means include window and vehicle suction cups, magnets, and various vehicle mounting brackets. When it becomes necessary for the user to return to his vehicle with an open umbrella in the rain, the user raises the rear umbrella carrier arm to an upright position and secures the umbrella handle to the rear carrier unit by tightly wrapping and locking the Velcro® strap around the handle. With the umbrella still open, the user enters the vehicle. If desired, the user can wait for a temporary pause or lessening of rainfall. The user partially opens the vehicle door and quickly reaches up, closes the umbrella, and lowers it forward to a near horizontal position in such a way that the closed umbrella canvas canopy contacts the front carrier arm. From inside the vehicle, the user quickly straps the closed umbrella canvas canopy to the front carrier arm by wrapping and locking the Velcro® strap around the canvas portion of the umbrella. The user then closes his door completely and is ready to drive away without the inconvenience of handling and storing a wet umbrella inside a vehicle.

Figure 2:
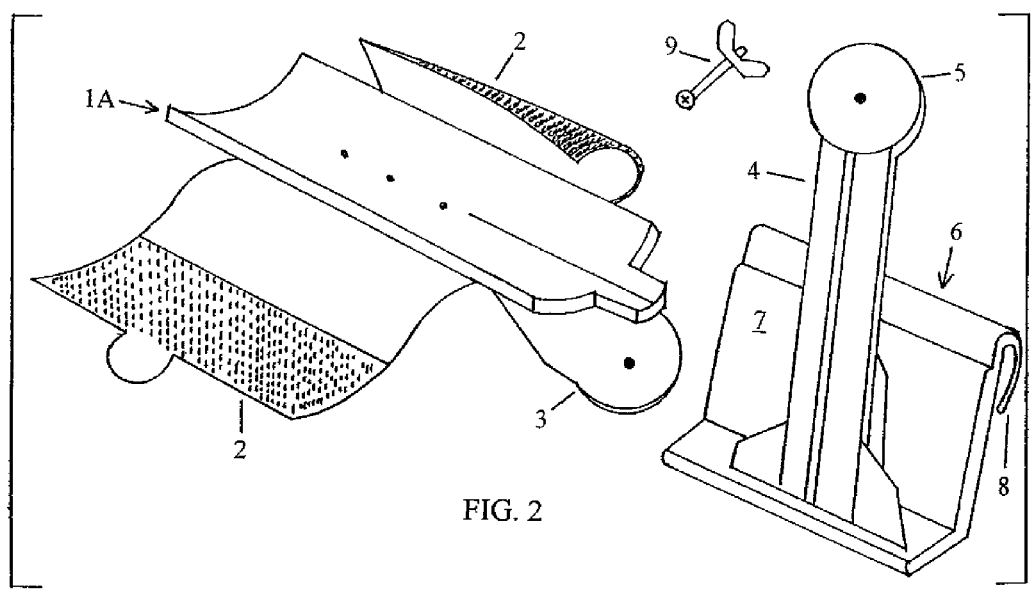
FIG. 2 is an exploded view of a preferred embodiment of the invention for a conventional umbrella displaying an umbrella carrier arm with Velcro® straps, a mounting pole coupled with a vehicle window support clip, and a bolt and wing nut for attaching the umbrella carrier arm to the mounting pole.

FIG. 2 illustrates an exploded view of the current preferred embodiment of the invention for a conventional umbrella. As illustrated, a strap carrier arm 1A includes a Velcro® strap 2 fastened by brads or some other means to the strap carrier arm 1A for securing an umbrella handle or a closed umbrella canvas canopy. The mounting pole 4 is coupled with a vehicle window support clip portion 6 having a flat support surface 7 adapted to engage the exterior surface of a vehicle window and a clip 8 adapted to engage the interior surface of a vehicle window. A foam/rubber pad (not shown) may be used between the flat support surface 7 and the exterior surface of the vehicle window. A strap carrier arm 1A flat disc joint 3 or socket joint (not shown) is to attach the strap carrier arm 1A to a mounting pole 4 at the flat disc joint 5 or ball joint (not shown) with a bolt and wing nut 9 or some other means (not shown). Those skilled in the art will appreciate that other temporary mounting means for an umbrella carrier arm now known or later developed, whether alone or in various combinations, may be employed without departing from the spirit or scope of the invention. Obvious temporary mounting means include window and vehicle suction cups, magnets, and various vehicle mounting brackets.

The strap carrier arm 1A and its flat disc joint 3 are preferably injection molded as a single piece. The length and thickness of the carrier arm and each other part will depend on the size and weight of the umbrella to be secured. Preferably, the length of the carrier arm will be at least 3 to 4 inches, the approximate length of an umbrella handle. The polymeric compound used for each part should be strong enough to withstand a vehicle speed of at least 70 mph. Similarly, mounting post 4 and its flat disc joint 5 along with vehicle window support clip portion 6 are preferably manufactured through injection molding of a polymeric compound as a single piece. Polypropylene is the currently preferred construction material, though other acceptable polymeric compounds include, but are not limited to: polyethylene, polystyrene, and polyvinyl chloride. Other vinyls, nylon, and lexan may also be used. The clip 8 could be constructed of a thin metal such as stainless steel, rather than a polymeric compound, and could fasten to the flat support surface 7 by brads or some other means. The mounting pole lengths are preferably 1 to 3 inches, but could vary according to the design of a particular vehicle window. Some vehicle windows slant downward and some vehicle door window frames are wider than others. Ideally, a closed, secured umbrella should lie horizontal, slightly above the vehicle door window frame. Similar manufacturing techniques, well known in the art, are to be used for manufacturing the remaining carrier arms as well.

Figure 3:
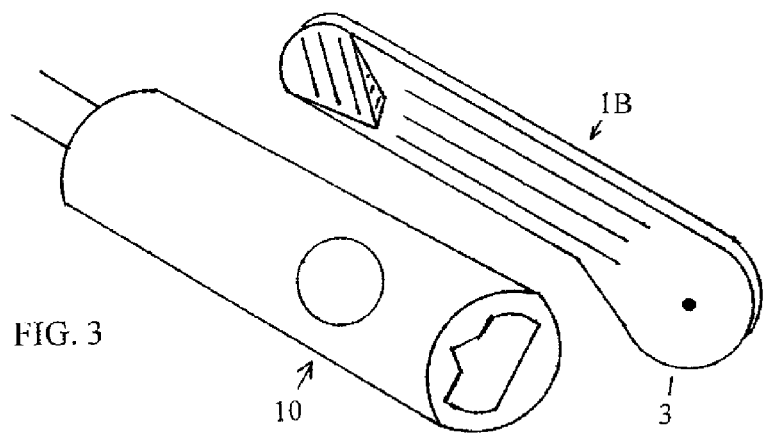
FIG. 3 is a view of an umbrella carrier arm consisting of a stem-like arm for inserting and clipping inside a specially designed umbrella handle.

FIG. 3 illustrates an alternate embodiment of the invention for a specially designed umbrella handle 10. In the illustration, a stem-like carrier arm 1B consists of a stem for inserting and clipping inside a specially designed umbrella handle 10 and a flat disc joint 3 for attaching to mounting post 4 at its flat disc joint 5 with a bolt and wing nut 9 as illustrated in FIG. 2.

Figure 4:
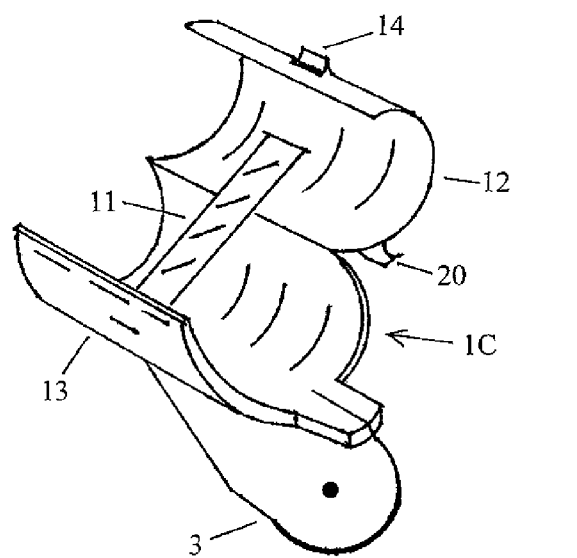
FIG. 4 is a view of an umbrella carrier arm consisting of a hinged latching device for quickly securing a closed umbrella canvas canopy.

FIG. 4 illustrates an alternate embodiment of the invention for quickly securing a closed umbrella canvas canopy. In the illustration a nylon strap 11 connects to each open half of a hinged latching device carrier arm 1C. To secure the canopy, a closed umbrella canvas canopy abruptly contacts the nylon strap 11, thereby causing the upper half 12 to quickly slam down and latch to the lower half 13 of the hinged latching device carrier arm 1C. The flexibility of the lower half 13 of the hinged latching device carrier arm 1C allows the latch to be disengaged by either pushing out and down on the rear handle 20 or pulling out and up on the front handle 14 of the upper half 12 of the hinged latching device carrier arm 1C. The flat disc joint 3 is for attaching to mounting pole 4 at its flat disc joint 5 with a bolt and wing nut 9 as illustrated in FIG. 2.

Figure 5:
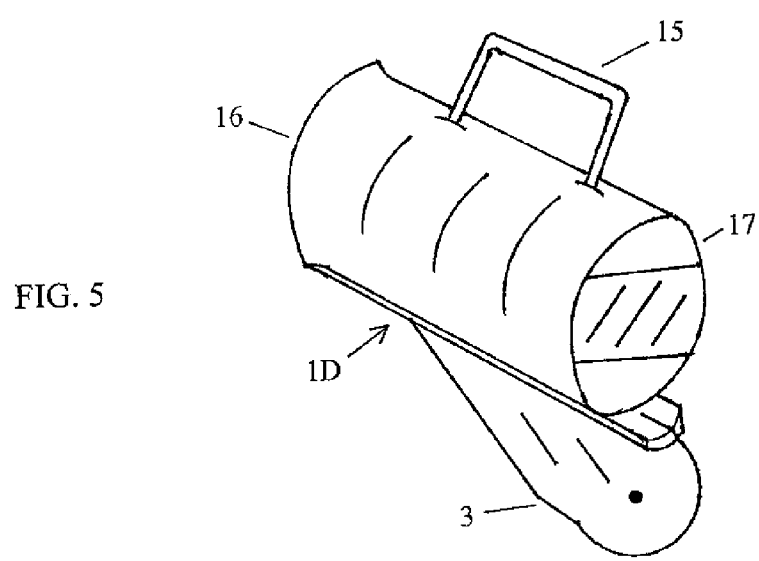
FIG. 5 is a view of an umbrella carrier arm consisting of a hollow sleeve for receiving an umbrella handle.

FIG. 5 illustrates an alternate embodiment of the invention for a specially sized and designed umbrella handle. In the illustration the hollow sleeve carrier arm 1D consists of a hollow sleeve which is open on one end 16 for receiving an umbrella handle and only partially open on the other end 17 for stopping the umbrella handle and for allowing drainage. An attached handgrip 15 is for raising to a vertical position and lowering to a horizontal position the hollow sleeve carrier arm 1D. The flat disc joint 3 is for attaching to mounting pole 4 at its flat disc joint 5 with a bolt and wing nut 9 as illustrated in FIG. 2.

Figure 6:
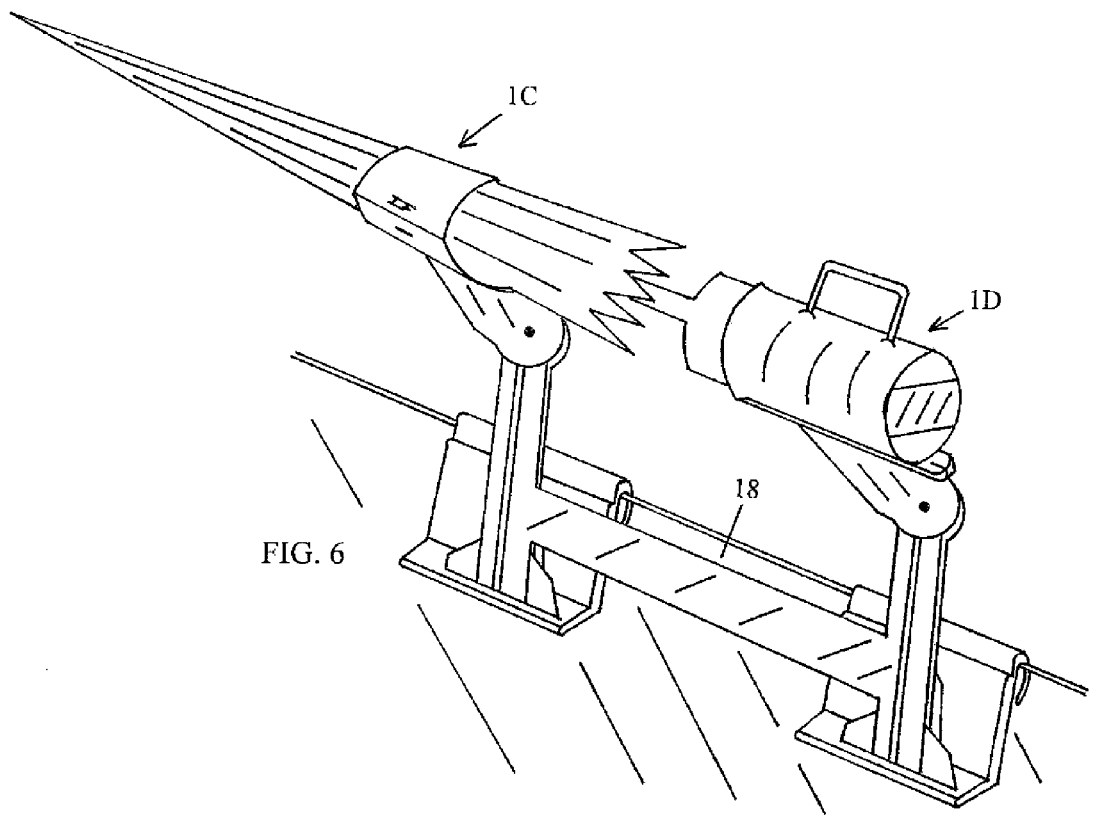
FIG. 6 is a view of an umbrella carrier unit arrangement that includes a hollow sleeve carrier arm for receiving an umbrella handle and a hinged latching device carrier arm for securing a closed umbrella canvas canopy. The mounting poles of each umbrella carrier unit are joined by a mounting pole connecting bar.

FIG. 6 illustrates an alternate embodiment of the invention for a specially designed umbrella and umbrella handle. In the illustration the rear umbrella carrier arm is the hollow sleeve carrier arm 1D for receiving an umbrella handle as shown in FIG. 5 and the front umbrella carrier arm is the hinged latching device carrier arm 1C as shown in FIG. 4. A mounting pole connecting bar 18 stabilizes both carrier arms and positions them in an optimum position in relation to one another for a particularly sized and designed umbrella and umbrella handle.

Figure 7:
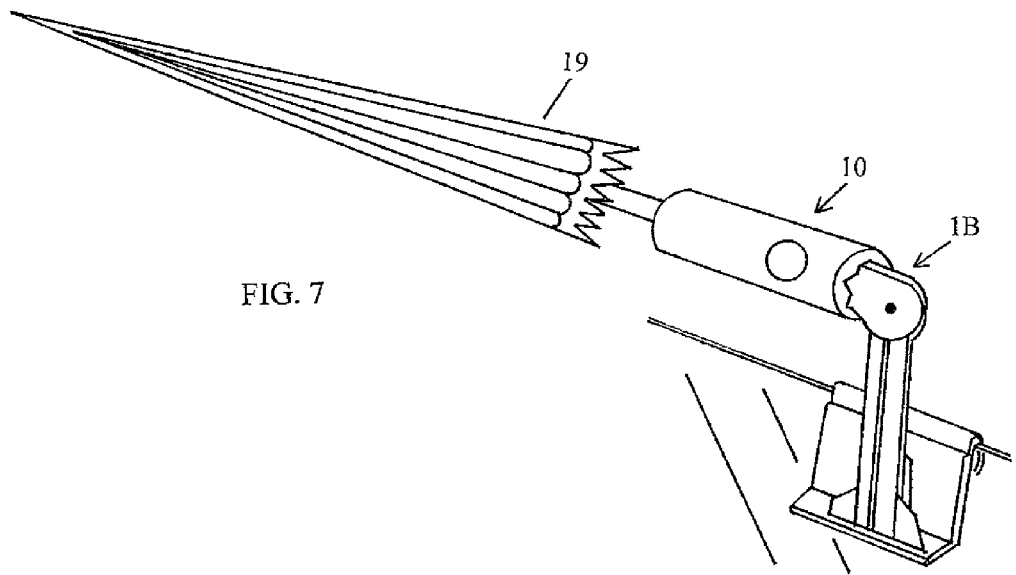
FIG. 7 is a view of an umbrella carrier unit with a stem-like carrier arm inserted and clipped inside a specially designed umbrella handle of a specially designed shielded umbrella. The stem-like carrier arm is attached to a mounting pole coupled with a vehicle window support clip.

FIG. 7 illustrates an alternate embodiment of the invention for a specially designed umbrella and umbrella handle. In the illustration the umbrella carrier arm is the stem-like carrier arm 1B for inserting and clipping inside an umbrella handle 10 as shown in FIG. 3. In this illustration the umbrella canvas canopy 19 is specially designed to close tightly and lock shut and is shielded to reduce wind resistance, therefore a second carrier arm is not needed to secure the closed umbrella canvas canopy.

It will be appreciated by those skilled in the art that even though numerous characteristics and advantages of the present invention have been set forth in the foregoing description, together with details of the structure and function of the invention, the disclosure is illustrative only and numerous alternate embodiments are possible without departing from the novel teachings of the invention.

For example, in FIG. 2 the contacting surfaces of the mounting pole 4 flat disc joint 5 and the strap carrier arm 1A flat disc joint 3 could include an indentation on one surface and a protrusion on the other surface such that the strap carrier arm 1A temporarily locks in an upright or horizontal position when the indentation and the protrusion line up. Also, a tension spring between the wing nut and the back of mounting pole 4 flat disc joint 5 could facilitate keeping the carrier arm in position when the indentation and the protrusion line up.

For example, the mounting pole 4 in FIG. 2 could be much shorter or even eliminated and flat disc joint 5 or a ball joint could be mounted directly to the exterior of flat support surface 7.

For example, the mounting pole connecting bar 18 of FIG. 6 could be used as a platform for supporting a remote controlled battery operated mechanism for raising and lowering the hollow sleeve carrier arm 1D and for engaging and releasing a latching device carrier arm.

For example, the hollow sleeve carrier arm 1D could be open on both ends and could be used like a napkin holder to secure a closed umbrella canvas.

For example, the hollow sleeve carrier arm 1D could also be much longer, closed on the front end, and used to secure a closed umbrella canvas. These and other modifications may be made in detail within the principles of the invention to the full extent indicated by the broad general meaning of the terms in which the appended claims are expressed.

I claim:

1. An umbrella carrier comprising:
   at least two umbrella carrier units comprising
      an umbrella carrier arm having a predetermined cross sectional shape and length and selected from the group consisting of a strap carrier arm (1A), a stem-like carrier arm (1B), a hinged latching device carrier arm (1C), a hollow sleeve carrier arm (1D);
      said umbrella carrier arm being attached by a movable joint to an elongated substantially vertically extending mounting pole, said mounting pole having a predetermined length and cross sectional shape and being of sufficient thickness and strength to stay attached to a moving vehicle, and
      said movable joint allowing a minimal pivotal movement of 90 degrees and adapted to allow said umbrella carrier arm to sequentially be placed in a substantially vertical position and in a substantially horizontal position, and
      said mounting pole being fastened to a vehicle window support clip portion having a flat support surface adapted to engage the exterior surface of a vehicle window and a clip adapted to engage the interior surface of a vehicle window, said flat support surface having a predetermined shape and sufficient area and thickness to support said mounting pole, and said clip having a predetermined shape to fit over the top of and engage the interior surface of the vehicle window and sufficient strength to hold up said flat support surface fastened to said mounting pole, and
      said predetermined length of said mounting pole being adapted to make said umbrella carrier arm, when in a substantially horizontal position, to lie immediately above or near a top edge of a vehicle door window frame, whereby said umbrella carrier arm can secure a closed umbrella in a substantially horizontal position immediately above or near a top edge of a vehicle door window frame with a tip of the closed umbrella pointing the same direction as said vehicle, thereby minimizing wind resistance and allowing said closed umbrella to be transported outside of said vehicle,
   wherein a first umbrella carrier unit secures an umbrella handle and a second umbrella carrier unit secures a closed umbrella canopy, and the two umbrella carrier units are joined together by an elongated substantially horizontally extending mounting pole connecting bar, said mounting pole connecting bar having a predetermined cross sectional shape and length and sufficient thickness to stabilize the two umbrella carrier units.

2. The umbrella carrier of claim 1, wherein said predetermined length of said mounting pole is less than 1 inch.

3. An umbrella carrier comprising:
   a first umbrella carrier arm adapted to secure an umbrella handle and having a predetermined cross sectional shape and length and selected from the group consisting of a strap carrier arm (1A), a stem-like carrier arm (1B), a hinged latching device carrier arm (1C), a hollow sleeve carrier arm (1D); and
   said first umbrella carrier arm being attached by a movable joint to an elongated substantially vertically extending first mounting pole, said first mounting pole having a predetermined length and cross sectional shape and being of sufficient thickness and strength to stay attached to a moving vehicle, and
   said movable joint allowing a minimal pivotal movement of 90 degrees and adapted to allow said first umbrella carrier arm to sequentially be placed in a substantially vertical position and in a substantially horizontal position, and
   a second umbrella carrier arm adapted to secure a closed umbrella canopy and having a predetermined cross sectional shape and selected from the group consisting of a strap carrier arm (1A), a stem-like carrier arm (1B), a hinged latching device carrier arm (1C), a hollow sleeve carrier arm (1D); and
   said second umbrella carrier arm being attached to an elongated substantially vertically extending second mounting pole, said second mounting pole having a predetermined length and cross sectional shape and being of sufficient thickness and strength to withstand speeds up to 70 miles per hour against a closed umbrella secured to said second mounting pole, and each first and second mounting pole being fastened to a corresponding first and second vehicle window support clip portion, each first and second vehicle window support clip portion having a flat support surface adapted to engage the exterior surface of a vehicle window and a clip adapted to engage the interior surface of a vehicle window, and each flat support surface having a predetermined shape and sufficient area and thickness to support said first and second mounting pole, and each clip having a predetermined shape to fit over the top of and engage the interior surface of the vehicle window and sufficient strength to hold up each flat support surface fastened to said first and second mounting pole, and said first and second mounting pole being joined to one another by an elongated substantially horizontally extending mounting pole connecting bar, said mounting pole connecting bar having a predetermined cross sectional shape and length and sufficient thickness to stabilize said first and second mounting pole, and each predetermined length of said first and second mounting pole being adapted to make each umbrella carrier arm, when in a substantially horizontal position, to lie immediately above or near a top edge of a vehicle door window frame, whereby the umbrella carrier arms can secure a closed umbrella's handle and the closed umbrella's canopy in a substantially horizontal position immediately above or near a top edge of a vehicle door window frame with a tip of the closed umbrella pointing the same direction as said vehicle, thereby minimizing wind resistance and allowing said closed umbrella to be transported outside of said vehicle.

4. An umbrella carrier comprising:

two umbrella carrier units comprising:

an umbrella carrier arm having a predetermined cross sectional shape and length and selected from the group consisting of a strap carrier arm (1A), a stem-like carrier arm (1B), a hinged latching device carrier arm (1C), a hollow sleeve carrier arm (1D); and said umbrella carrier arm being attached by a movable joint to an elongated substantially vertically extending mounting pole, said mounting pole having a predetermined length and cross sectional shape and being of sufficient thickness and strength to stay attached to a moving vehicle, and said movable joint allowing a minimal pivotal movement of 90 degrees and adapted to allow said umbrella carrier arm to sequentially be placed in a substantially vertical position and in a substantially horizontal position, and said mounting pole being secured to an exterior vehicle temporary mounting means comprising suction cups, magnets, mounting brackets, vehicle window support clips, and combinations thereof, and said predetermined length of said mounting pole being adapted to make said umbrella carrier arm, when in a substantially horizontal position, to lie immediately above or near a top edge of a vehicle door window frame, whereby said umbrella carrier arm can secure a closed umbrella in a substantially horizontal position immediately above or near a top edge of a vehicle door window frame with a tip of the closed umbrella pointing the same direction as said vehicle, thereby minimizing wind resistance and allowing said closed umbrella to be transported outside of said vehicle wherein a first umbrella carrier unit secures an umbrella handle and a second umbrella carrier unit secures a closed umbrella canopy, and the two umbrella carrier units are joined together by an elongated substantially horizontally extending mounting pole connecting bar, said mounting pole connecting bar having a predetermined cross sectional shape and length and sufficient thickness to stabilize the two umbrella carrier units.

* * * * *